United States Patent
Nicholas et al.

(10) Patent No.: US 11,415,540 B2
(45) Date of Patent: Aug. 16, 2022

(54) TECHNOLOGIES USING NITROGEN-FUNCTIONALIZED PSEUDO-GRAPHITE

(71) Applicants: ABB Schweiz AG, Baden (CH); University of Idaho, Moscow, ID (US)

(72) Inventors: Nolan Nicholas, Granby, CT (US); Ignatius Cheng, Moscow, ID (US); Haoyu Zhu, Moscow, ID (US); Humayun Kabir, Moscow, ID (US); Kailash Hamal, Moscow, ID (US); Jeremy May, Moscow, ID (US)

(73) Assignees: ABB Schweiz AG, Baden (CH); University of Idaho, Moscow, ID (US)

( * ) Notice: Subject to any disclaimer, the term of this patent is extended or adjusted under 35 U.S.C. 154(b) by 433 days.

(21) Appl. No.: 16/292,323

(22) Filed: Mar. 5, 2019

(65) Prior Publication Data

US 2020/0284750 A1    Sep. 10, 2020

(51) Int. Cl.
*G01N 27/30* (2006.01)
*H01M 4/90* (2006.01)

(52) U.S. Cl.
CPC ........ *G01N 27/308* (2013.01); *H01M 4/9008* (2013.01)

(58) Field of Classification Search
CPC ........... G01N 27/3271; G01N 27/4167; G01N 27/4168; G01N 27/308; H01M 4/96; H01M 4/9008; Y02E 60/50
See application file for complete search history.

(56) References Cited

U.S. PATENT DOCUMENTS

| | | |
|---|---|---|
| 4,725,422 A | 2/1988 | Miyabayashi et al. |
| 5,290,592 A | 3/1994 | Izuchi et al. |
| 5,571,638 A | 11/1996 | Satoh et al. |
| 7,442,358 B2 | 10/2008 | Sano et al. |
| 9,691,556 B2 | 6/2017 | Cheng et al. |
| 2005/0079119 A1 | 4/2005 | Kawakami et al. |
| 2006/0062713 A1 | 3/2006 | Sano et al. |
| 2006/0062715 A1 | 3/2006 | Endo et al. |
| 2006/0121279 A1 | 6/2006 | Petrik |
| 2007/0092432 A1 | 4/2007 | Prud'Homme et al. |
| 2009/0068471 A1 | 3/2009 | Choi et al. |
| 2009/0155561 A1 | 6/2009 | Choi et al. |
| 2012/0228555 A1 | 9/2012 | Cheng et al. |

(Continued)

FOREIGN PATENT DOCUMENTS

| | | |
|---|---|---|
| CN | 1715899 A | 4/2006 |
| CN | 107017270 A | 8/2017 |

(Continued)

OTHER PUBLICATIONS

English Machine Translation of WO 2014116026 (Year: 2014).*

(Continued)

*Primary Examiner* — Gurpreet Kaur
(74) *Attorney, Agent, or Firm* — Armstrong Teasdale LLP

(57) ABSTRACT

Methods, electrodes, and electrochemical devices using nitrogen-doped pseudo-graphite are disclosed. In one illustrative embodiment, a method may include doping a pseudo-graphite material with nitrogen to form a doped pseudo-graphite material. The method may also include applying the doped pseudo-graphite material to a surface of a substrate of an electrode.

21 Claims, 7 Drawing Sheets

(56) References Cited

U.S. PATENT DOCUMENTS

| | | |
|---|---|---|
| 2012/0304743 A1 | 12/2012 | Rajasekharan |
| 2014/0001047 A1 | 1/2014 | Kahn et al. |
| 2014/0111906 A1 | 4/2014 | Eilertsen |
| 2015/0377824 A1 | 12/2015 | Ruhl et al. |
| 2017/0008825 A1 | 1/2017 | Johnson et al. |
| 2017/0169959 A1 | 6/2017 | Cheng et al. |
| 2018/0224390 A1 | 8/2018 | Pan et al. |
| 2019/0041356 A1 | 2/2019 | Pan et al. |
| 2019/0079043 A1 | 3/2019 | Johnson, Jr. et al. |
| 2020/0284747 A1 | 9/2020 | Nicholas et al. |
| 2020/0284748 A1 | 9/2020 | Nicholas et al. |
| 2020/0284749 A1 | 9/2020 | Nicholas et al. |
| 2020/0284750 A1 | 9/2020 | Nicholas et al. |
| 2020/0284751 A1 | 9/2020 | Nicholas et al. |
| 2020/0284755 A1 | 9/2020 | Nicholas et al. |

FOREIGN PATENT DOCUMENTS

| | | | |
|---|---|---|---|
| EP | 0165047 A2 | 12/1985 | |
| JP | 2017027919 A | 2/2017 | |
| KR | 20100118808 A | 11/2010 | |
| KR | 1020110069458 A | 6/2011 | |
| RU | 2163375 C2 | 2/2001 | |
| WO | 1998/020331 A1 | 1/1998 | |
| WO | 2001/064938 A2 | 9/2001 | |
| WO | 2002/082069 A1 | 10/2002 | |
| WO | WO-2014116026 A1 * | 7/2014 | ........... H01G 9/2022 |

OTHER PUBLICATIONS

ISA/RU, International Search Report and Written Opinion for Related PCT International Patent Application No. PCT/JS2020/021130, dated Jun. 18, 2020, 8 pages.

ISA/RU, International Search Report and Written Opinion for Related PCT International Patent Application No. PCT/US2020/021137, dated Jun. 18, 2020, 8 pages.

ISA/RU, International Search Report and Written Opinion for Related PCT International Patent Application No. PCT/JS2020/021145, dated Jun. 18, 2020, 8 pages.

ISA/RU, International Search Report and Written Opinion for Related PCT International Patent Application No. PCT/US2020/021149, dated Jun. 11, 2020, 6 pages.

Humayun Kabir et al., "The sp2-sp3 carbon hybridization content of nanocrystalline graphite from pyrolyzed vegetable oil, comparison of electrochemistry and physical properties with other carbon forms and allotropes," Carbon, vol. 144, Apr. 2019, pp. 831-840.

Minhua Shao et al., "Recent Advances in Electrocatalysts for Oxygen Reduction Reaction," Chemical Reviews, vol. 116(6), Feb. 17, 2016, pp. 3594-3657.

Andrew A. Gewirth et al., "Nonprecious Metal Catalysts for Oxygen Reduction in Heterogeneous Aqueous Systems," Chemical Reviews, vol. 118(5), Jan. 31, 2018, pp. 2313-2339.

Subal Dey et al, "Molecular electrocatalysts for the oxygen reduction reaction," Nature Reviews Chemistry, vol. 1(98), Dec. 6, 2017, pp. 1-20.

Olga Naumov et al., "The stability limits of highly active nitrogen doped carbon ORR nano-catalysts: a mechanistic study of degradation reactions," Nanoscale, vol. 10(14), Mar. 1, 2018, pp. 6724-6733.

Yanguang Li et al., "Metal-Air Batteries: Will They Be the Future Electrochemical Energy Storage Device of Choice?," ACS Energy Letters, vol. 2(6), May 5, 2017, pp. 1370-1377.

Bin Xu et al., "Modification of vertically aligned carbon nanotubes with RuO2 for a solid-state pH sensor," Electrochimica Acta, vol. 55(8), Mar. 1, 2010, pp. 2859-2864.

Tong-Shen Liu et al., "Au-Fe(III) nanoparticle modified glassy carbon electrode for electrochemical nitrite sensor," Journal of Electroanalytical Chemistry, vol. 632(1-2) Jul. 1, 2019, pp. 197-200.

Kristin R. Kneten et al., "Effects of Redox System Structure on Electron-Transfer Kinetics at Ordered Graphite and Glassy Carbon Electrodes," Analytical Chemistry, vol. 64(21), Nov. 1, 1992, pp. 2518-2524.

Claudia C. Villarreal et al., "Carbon allotropes as sensors for environmental monitoring," Current Opinion in Electrochemistry, vol. 3(1), Jun. 2017, pp. 106-113.

Kevin W. Hathcock et al., "Incipient Electrochemical Oxidation of Highly Oriented Pyrolytic Graphite: Correlation between Surface Blistering and Electrolyte Anion Intercalation," Analytical Chemistry, vol. 67(13), Jul. 1, 1995, 2201-2206.

Paul K. Chu et al., "Characterization of amorphous and nanocrystalline carbon films," Materials Chemistry and Physics, vol. 96(2-3), Apr. 10, 2006, pp. 253-277.

Isaiah O. Gyan et al., "A Study of the Electrochemical Properties of a New Graphitic Material: GUITAR," ChemElectroChem, vol. 2(5), Feb. 12, 2015, pp. 700-706.

Zhen Yuan Xia et al., "Synergic Exfoliation of Graphene with Organic Molecules and Inorganic Ions for the Electrochemical Production of Flexible Electrodes," ChemPlusChem, vol. 79(3), Jan. 29, 2014, pp. 439-446.

"Carbon Nanotube | Purity | Evaluation of Purity and Heat Resistance," Schmadzu, online at https://www.shimadzu.com/an/industry/ceramicsmetalsmining/0102005.html, downloaded Oct. 10, 2019, 4 pages.

B. Rösner et al., "Dispersion and characterization of arc discharge single-walled carbon nanotubes—towards conducting transparent films," Nanoscale, vol. 6(7), Jan. 14, 2014, pp. 3695-3703.

So Yeun Kim et al., "Facile Synthesis of Carbon-Coated Silicon/Graphite Spherical Composites for High-Performance Lithium-Ion Batteries," ACS Applied Materials & Interfaces, vol. 8(19), Apr. 26, 2016, pp. 12109-12117.

Konstantinos Spyrou et al., "A novel route towards high quality fullerene-pillared graphene," Carbon, vol. 61, Sep. 2013, pp. 313-320.

Jarmila Vilčáková et al., "Effect of Surfactants and Manufacturing Methods on the Electrical and Thermal Conductivity of Carbon Nanotube/Silicone Composites," Molecules, vol. 17(11), Nov. 5, 2012, pp. 13157-13174.

Shuai Chen et al., "Branched CNT@SnO2 nanorods@carbon hierarchical heterostructures for lithium ion batteries with high reversibility and rate capability," Journal of Materials Chemistry A, vol. 2(37), Jul. 22, 2014, pp. 15582-15589.

Franco Cataldo, "A Study On the Thermal Stability To 1000° C. of Various Carbon Allotropes and Carbonaceous Matter Both Under Nitrogen and in Air," Fullerenes, Nanotubes and Carbon Nanostructures, vol. 10(4), Dec. 2002, pp. 293-311.

Xin Li et al., "Fabrication of ZnO nanowires array with nanodiamond as reductant," RSC Advances, vol. 6(99), Sep. 27, 2016, pp. 96479-96483.

Reeti Bajpai et al., "Rapid growth of onion-like carbon nanospheres in a microwave oven," CrystEngComm, Nov. 13, 2015, vol. 18(2), pp. 230-239.

R.I.R. Blyth et al., "XPS studies of graphite electrode materials for lithium ion batteries," Applied Surface Science, Oct. 16, 2000, vol. 167(1-2), pp. 99-106.

Jessica Campos-Delgado et al., "Bulk Production of a New Form of sp2 Carbon: Crystalline Graphene Nanoribbons," Nano Letters, Aug. 14, 2008, vol. 8(9), pp. 2773-2778.

Frank Cheng, "GUITAR: A New Material For Dimensionally Stable Anodes," Seminar Given To Washington State University Department of Civil and Environmental Engineering, May 2012, published online at https://www.webpages.uidaho.edu/ifcheng/recent_seminars_and_presentation.htm, 96 pages.

Frank Cheng et al., "GUITAR: A New Material For Dimensionally Stable Anodes," Paper No. 19649, 244th American Chemical Society National Meeting, Philadelphia, PA, Aug. 2012, published online at https://www.webpages.uidaho.edu/ifcheng/recent_seminars_and_presentation.htm, 69 pages.

I. Francis Cheng et al., "Highest measured anodic stability in aqueous solutions: graphenic electrodes from the thermolyzed asphalt reaction," RSC Advances, Feb. 21, 2013, vol. 3(7), pp. 2379-2384.

I. Francis Cheng et al., "Synthesis of graphene paper from pyrolyzed asphalt," Carbon, Jul. 2011, vol. 49(8), pp. 2852-2861.

Henriette Estrade-Szwarckopf, "XPS photoemission in carbonaceous materials: A "defect" peak beside the graphitic asymmetric peak," Carbon, Dec. 2004, vol. 42(8-9), pp. 1713-1721.

(56) References Cited

OTHER PUBLICATIONS

Yuqun Xie et al., "Sulfur as an important co-factor in the formation of multilayer graphene in the thermolyzed asphalt reaction," Journal of Materials Chemistry, Mar. 28, 2012, vol. 22(12), pp. 5723-5729.
Ashleigh Anderson et al., "Investigating the Use of Endogenous Quinoid Moieties on Carbon Fibre as Means of Developing Micro pH Sensors," Materials Science and Engineering C, 2014, 533-537, 2014.
Isaiah O. Gyan et al., "Supporting Information: A Study of the Electrochemical Properties of a New Graphitic Material: GUITAR," ChemElectroChem, 2015, 12 pages.
Isaiah O. Gyan et al., "Electrochemical Study of Biologically Relevant Molecules at Electrodes Constructed from GUITAR, a New Carbon Allotrope," Microchemical Journal, vol. 122, pp. 39-44, Apr. 8, 2015.

\* cited by examiner

TECHNOLOGIES USING NITROGEN-FUNCTIONALIZED PSEUDO-GRAPHITE

CROSS-REFERENCE TO RELATED APPLICATIONS

This application is related to U.S. patent application Ser. No. 16/292,317 (titled "Chemical Oxygen Demand Sensing Using Pseudo-Graphite"), Ser. No. 16/292,318 (titled "Chlorine Species Sensing Using Pseudo-Graphite"), Ser. No. 16/292,320 (titled "pH Sensing Using Pseudo-Graphite"), Ser. No. 16/292,322 (titled "Technologies Using Pseudo-Graphite Composites"), and Ser. No. 16/292,325 (titled "Technologies Using Surface-Modified Pseudo-Graphite"), all of which were filed on Mar. 5, 2019, by the co-applicants of the present application. The disclosures of the foregoing patent applications are all incorporated herein by reference in their entirety.

BACKGROUND

The present disclosure relates to technologies using nitrogen-functionalized pseudo-graphite, and more particularly to the utilization of electrodes with nitrogen-functionalized pseudo-graphite for performing electrochemical operations such as for detecting chemical species.

Generally, electrodes in some sensors are capable of detecting chemical species, for example, chemical species in a liquid. The electrodes may be utilized to detect a concentration of chemical species in the liquid by applying a potential across the electrode and measuring a resultant signal. However, most chemical detection electrodes have a high cost and may produce a low performance. Additionally, the electrode performance may be reduced due to fouling of the electrode or environmental interferences.

SUMMARY

The present disclosure includes one or more of the features recited in the appended claims and/or the following features which, alone or in any combination, may comprise patentable subject matter.

According to an aspect of the disclosed embodiments, a method may include doping a pseudo-graphite material with nitrogen to form a nitrogen-doped pseudo-graphite material. The method may also include applying the nitrogen-doped pseudo-graphite material to a surface of an electrode substrate to form an electrode.

In some embodiments, doping the pseudo-graphite material with nitrogen may include decomposing a nitrogen-bearing hydrocarbon molecule to form a nitrogen-doped film of pseudo-graphite material. Applying the nitrogen-doped pseudo-graphite material to the surface of the substrate may include applying the nitrogen-doped film of pseudo-graphite material to the surface of the substrate. Applying the nitrogen-doped film of pseudo-graphite material to the surface of the substrate may include applying the nitrogen-doped film of pseudo-graphite material to a surface of the substrate that is coated with a pseudo-graphite material surface. Applying the nitrogen-doped film of pseudo-graphite material to a surface of the substrate that is coated with a pseudo-graphite material surface may include applying the nitrogen-doped film of pseudo-graphite material to a surface of the substrate that is coated with a pseudo-graphite material surface that has been chemically modified. The pseudo-graphite material surface may be modified prior to coating the pseudo-graphite material surface with the nitrogen-doped pseudo-graphite material by oxidizing the pseudo-graphite material surface with a solution of sulfuric acid, sodium nitrate, and water. The pseudo-graphite material surface may be modified prior to coating the pseudo-graphite material surface with the nitrogen-doped pseudo-graphite by applying streams of oxygen diluted by inert gas. The pseudo-graphite material surface may modified prior to coating the pseudo-graphite material surface with the nitrogen-doped pseudo-graphite by applying an atmosphere containing at least one of ozone, carbon dioxide, or vapor. Optionally, doping a pseudo-graphite material with nitrogen may include flowing cyanoguanidine and an inert gas over the pseudo-graphite material.

According to another aspect of the disclosed embodiments, an electrode may include an electrode substrate having a surface. A nitrogen-functionalized pseudo-graphite material may be applied to the surface of the substrate.

In some embodiments, the nitrogen-functionalized pseudo-graphite material may include a nitrogen-doped film of pseudo-graphite material formed from decomposition of a nitrogen-bearing hydrocarbon molecule. The nitrogen-doped film of pseudo-graphite material may be applied to a surface of the substrate that is coated with a pseudo-graphite material surface. The nitrogen-doped film of pseudo-graphite material may be applied to a surface of the substrate that is coated with a pseudo-graphite material surface that has been chemically modified. The pseudo-graphite material surface may be modified prior to coating the pseudo-graphite material surface with nitrogen-doped pseudo-graphite by oxidizing the pseudo-graphite material. The nitrogen-functionalized pseudo-graphite material may include amine groups functionalized onto a surface of pseudo-graphite material.

According to yet another aspect of the disclosed embodiments, an electrochemical device may include an electrode including a nitrogen-functionalized pseudo-graphite material applied to a surface of a substrate of the electrode. An electrical source may supply at least one of a current or voltage to the electrode.

In some embodiments, a measurement circuit may measure a resultant signal from the electrode. The device may facilitate an electrochemical reduction of an oxidizing species. The device may facilitate an oxygen reduction reaction of the oxidizing species. The device may facilitate sensing a presence and amount of oxygen. The device may be a fuel cell.

Optionally, the nitrogen-functionalized pseudo-graphite material may include a nitrogen-doped film of pseudo-graphite material. The nitrogen-functionalized pseudo-graphite material may include amine groups functionalized onto a surface of pseudo-graphite material.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
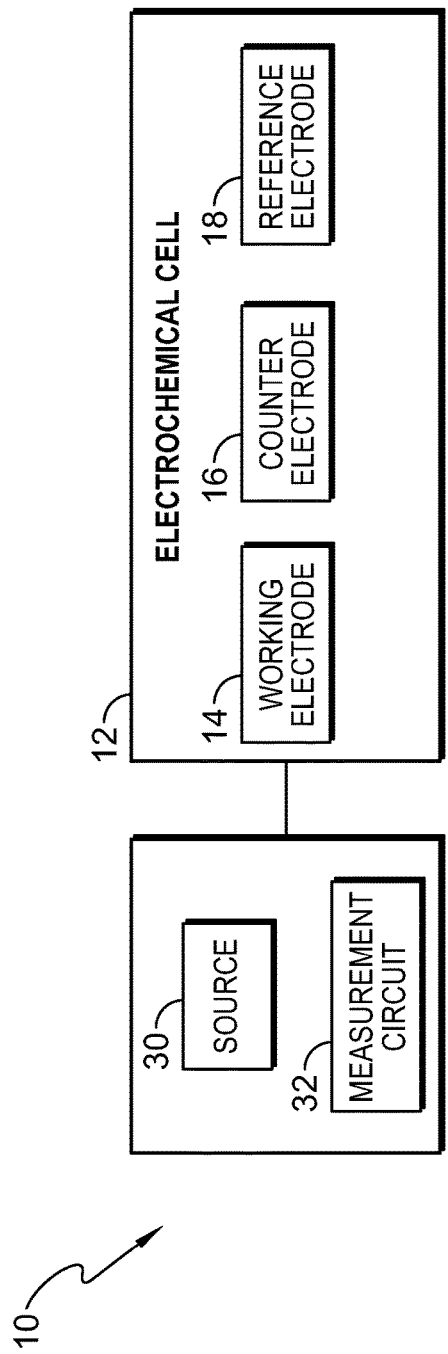
FIG. 1 is a simplified block diagram of a sensor device in accordance with an embodiment.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring to FIG. 1, in one illustrative embodiment, a sensor device 10 includes an electrochemical cell 12 configured to be positioned within a liquid having a chemical species. The electrochemical cell 12 houses a working electrode 14, a counter electrode 16, and a reference electrode 18. In some embodiments, the electrochemical cell 12 only houses the working electrode 14 and the counter electrode 16, and does not include a reference electrode 18. In other embodiments, the reference electrode 18 and working electrode 14 may be combined into a single electrode. The working electrode 14 is electrically coupled to a source 30. The working electrode 14 is electrically coupled to a source 30. The source 30 may be a current source or a voltage source. Each electrode 14, 16, 18 is coupled to a measuring circuit 32 that is configured to measure current or voltage, depending on the type of source 30.

In an embodiment where the source 30 is a current source, the source 30 applies a known current to the working electrode 14. The measuring circuit 32 detects a resultant current between the working electrode 14 and the counter electrode 16. By comparing the resultant current to a current at the reference electrode 18, a concentration of chemical species in the liquid may be detected.

In an embodiment where the source 30 is a voltage source, the source 30 applies a known voltage to the working electrode 14 that is held at a controlled potential relative to a reference. The measuring circuit 32 detects a resultant voltage or current between the working electrode 14 and the counter electrode 16. By comparing the resultant voltage to a voltage at the reference electrode 18, a concentration of chemical species in the liquid may be detected.

Figure 2:
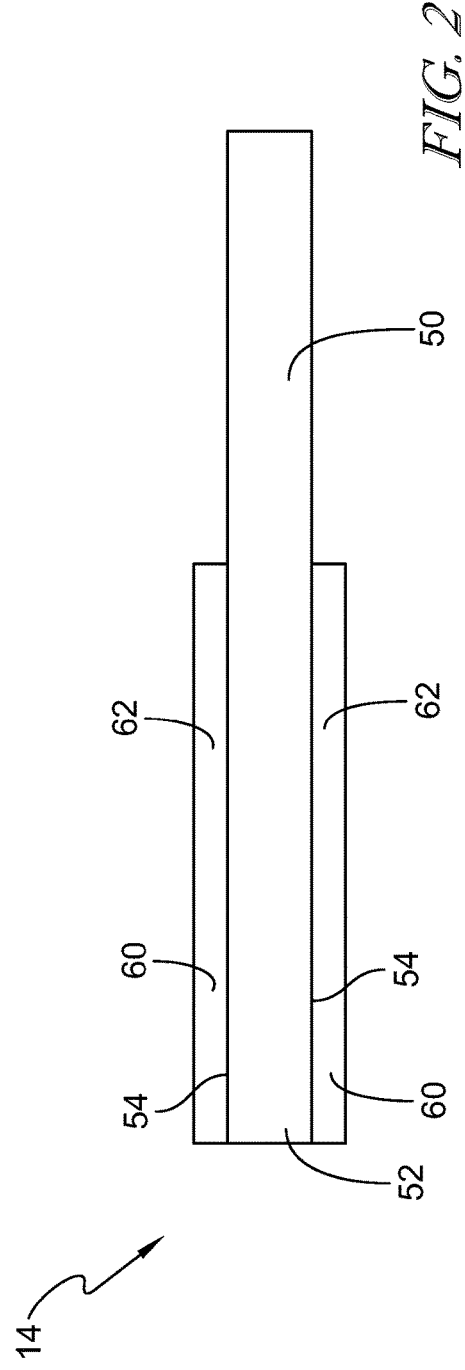
FIG. 2 is a cross-sectional view of the working electrode shown in FIG. 1.

Referring now to FIG. 2, in one illustrative embodiment, the working electrode 14 includes a substrate 50 having at least one surface 52 with a coatable surface 54. In some embodiments, the electrode 14 is a composite electrode. The coatable surface 54 may be selected from at least one of nanosprings, nanotubes, diatomites, a metal, glass, mica, germanium, and silicon (including porous high surface area electrochemically etched silicon). The metal may be selected from copper or iron. The coatable surface 54 may possess suitable thermal stability, chemical stability at fabrications temperatures and surface chemistry to have a pseudo-graphite applied thereon. The coatable surface 54 may also have relatively low thermal expansion between the deposition conditions and room temperature. For synthesis/fabrication purposes this includes stable ceramics such as $SiO_2$ (which includes micro- and nano-sized structures such as nanosprings and diatomites), as well as other ceramics like $Al_2O_3$ (including halloysite and anodized aluminum oxide membranes), MgO, iron oxides, silicon, cenospheres, and the like. It also includes suitable carbons such as graphite fibers and carbon black and some high temperature tolerant metals such as tungsten and molybdenum. A pseudo-graphite 54 is coated onto the surface 52 of the substrate 50. The illustrative embodiment shows the pseudo-graphite 54 coated on two surfaces 52 of the substrate 50. In some embodiments, the pseudo-graphite is only coated on a single surface 52 of the substrate 50. In some embodiments, the pseudo-graphite 54 is coated around the substrate 50. The pseudo-graphite 54 may be modified with an electrochemically sensitive material 62 to alter a sensing property of the electrode 14 to enhance the electrode 14.

As used in the present disclosure, "pseudo-graphite" refers to an allotrope of carbon that is graphite-like, but that has one or more improved properties as compared to graphite and to graphene. These improved properties may include fast heterogeneous electron transfer (HET) at a basal plane of the pseudo-graphite and/or corrosion resistance greater than graphite and graphene. In some embodiments, the pseudo-graphite may be a nanocrystalline-graphite that is in Stage-2 of Ferrari's amorphization trajectory between amorphous carbon and graphite. In some embodiments, the pseudo-graphite has a nanocrystallite size of 1.5 nm, as measured by X-Ray Diffraction (XRD). The pseudo-graphite may have a layered morphology but, in contrast to graphites and graphenes, has a resistance to monoloyer exfoliation. Instead, pseudo-graphite typically exfoliates in thick films of several hundred monolayers at a time.

In some embodiments, the pseudo-graphite may have a sp2/sp3 carbon ratio of about 85/15. In other embodiments, the carbon content of the pseudo-graphite may include between 80-90% sp2 carbon and 10-20% sp3 carbon. In still other embodiments, the carbon content of the pseudo-graphite may include between 75-95% sp2 carbon and 5-25% sp3 carbon. By contrast, typical graphites and graphenes both are near 100% sp2 carbon. For clarity, the pseudo-graphite can contain additional elements besides carbon. For instance, some pseudo-graphites include about 11 atomic % hydrogen.

The appearance of pseudo-graphite may be similar to a crystalline graphite but differs in that both the basal and edge planes (EP) have facile heterogeneous electron transfer (HET) kinetics. The basal plane (BP) of graphites have a barrier to HET as these materials are zero-band gap semiconductors. On the other hand, structural defects within the molecular planes of BP pseudo-graphite may increase density of electronic states (DOS) near the Fermi-level with corresponding HET rates. With the $Fe(CN)_6^{3-/4-}$ redox probe, BP and EP pseudo-graphite have achieved a standard HET rate)($k^0$) of $10^{-2}$ cm/s. Other distinguishing features can include slow hydrogen evolution kinetics and/or molecular planes that are impervious to sub-surface electrolyte intercalation, making the pseudo-graphite more resistant to corrosion than graphites and graphenes. These features can provide a wide electrochemical potential window of 3 V at 200 μA/cm$^2$ in 1 M $H_2SO_4$, which surpasses other sp2 carbon electrodes by 1 V and provides pseudo-graphite similar properties to boron-doped diamond.

Illustrative examples of "pseudo-graphite," and methods of producing such materials, are disclosed in each of U.S. Pat. No. 9,691,556, U.S. Patent Application Publication No. 2012/0228555, and Humayun Kabir et al., "The sp2-sp3 carbon hybridization content of nanocrystalline graphite from pyrolyzed vegetable oil, comparison of electrochemistry and physical properties with other carbon forms and allotropes," published in Carbon, volume 144, pages 831-840. The entire disclosures of each of the foregoing references are incorporated herein by reference.

While the pseudo-graphite 54 itself possesses many advantageous electrochemical properties, modifying the pseudo-graphite 54 via nitrogen-doping may improve the range of functionality and efficacy of the pseudo-graphite 54 for various applications. Such modification can provide improved electrode characteristics for a variety of applications.

Figure 3:
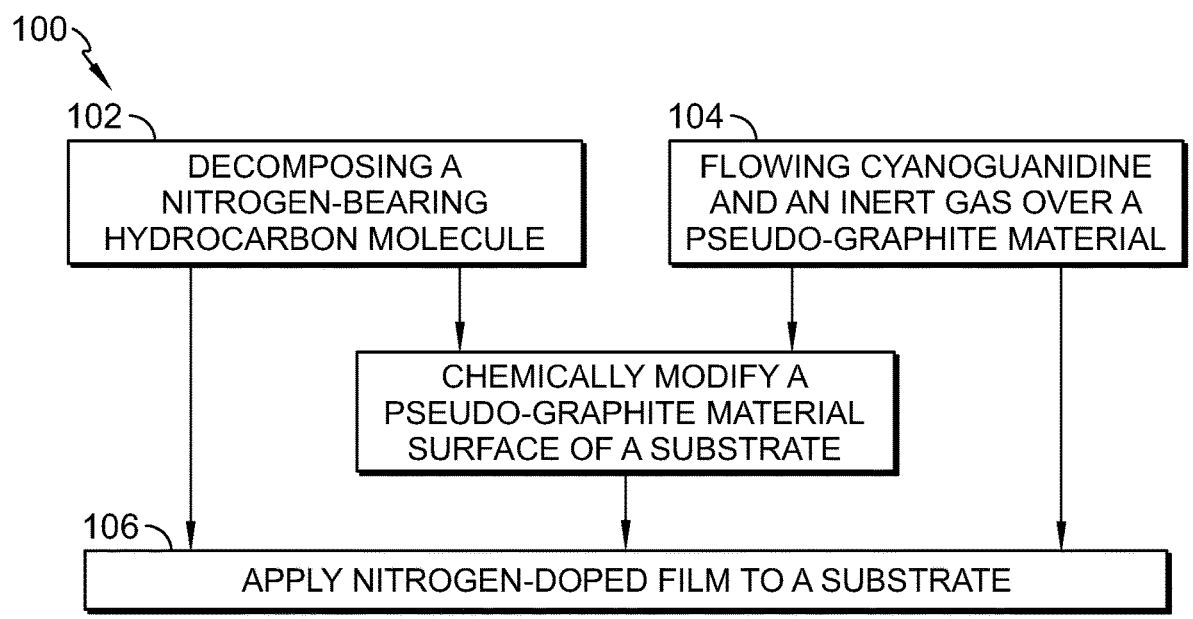
FIG. 3 is a flowchart of a method for forming a n-pseudo-graphite electrode.

Referring to FIG. 3, a method 100 of forming a nitrogen-doped pseudo-graphite electrode includes decomposing a nitrogen-bearing hydrocarbon molecule to form a nitrogen-doped film of pseudo-graphite material, at block 102. Synthesizing the nitrogen-doped pseudo-graphite material with nitrogen may include flowing cyanoguanidine and an inert gas over a pseudo-graphite material, at block 104. At block 106, the nitrogen-doped film of pseudo-graphite material may be applied to a surface of a substrate. For example, the nitrogen-doped film of pseudo-graphite may be applied to a surface of a substrate that is coated with a pseudo-graphite material. In some embodiments, the pseudo-graphite material surface may be pseudo-graphite material surface may be chemically modified, at block 108, before the nitrogen-doped film of pseudo-graphite is applied to a surface of a substrate. For example, the pseudo-graphite material surface may be modified prior to coating it with nitrogen-doped pseudo-graphite by oxidizing the pseudo-graphite material with a solution of sulfuric acid, sodium nitrate, and water.

A nitrogen-doped electrode may be formed by a method in which the pseudo-graphite material surface 60 is chemically oxidized. The chemical oxidation can be via methods such as wet chemical treatment in an oxidizing solution. In some embodiments, the oxidizing solution comprises an acid, a nitrate, a peroxide, or a mixture thereof. In some embodiments, the oxidizing solution comprises an acid, a nitrate, and a peroxide. In some embodiments, the oxidizing solution comprises 98% $H_2SO_4$+$NaNO_3$+30% $H_2O_2$ in a ratio of approximately 10 mL:0.1 g:1.5 mL.

The acid of the oxidizing solution can be a mineral acid or an organic acid. Illustrative mineral acids include sulfuric acid, hydrochloric acid, nitric acid, phosphoric acid, perchloric acid, and boric acid. Illustrative organic acids include sulfonic acids and substituted or unsubstituted acetic acids. The acid may be present in the oxidizing solution at a concentration and under treatment conditions, such as time and temperature, which provide for oxidative modification of the pseudo-graphite surface.

In some embodiments, the chemical oxidation of the pseudo-graphite may be performed in conjunction with the pseudo-graphite synthesis process without solution phase processing. For instance, after the process of chemical vapor deposition (CVD) to form the pseudo-graphite, a second step may be carried out in the CVD chamber to oxidatively modify the pseudo-graphite by introducing an oxidizing compound into the gas phase. One example of such an oxidation chemistry includes the use of streams of oxygen diluted by inert gas with dilutions typically of between 0.001%-1% and treatment temperatures of between 300-800 degrees Celcius. Another example of such an oxidation chemistry includes the use of atmospheres containing ozone at around room temperature. Another example of such an oxidation chemistry includes the use of atmospheres containing carbon dioxide at temperatures from about 500-1000 degrees Celcius. Another example of such an oxidation chemistry includes the use of atmospheres containing water vapor at temperatures from about 600-1000 degrees Celcius.

The oxidized pseudo-graphite material particles and a nitrogen-rich precursor are mixed to form a mixture. In some embodiments, the nitrogen-rich precursor comprises a triazine. In some embodiments, the nitrogen-rich precursor comprises melamine. In some embodiments, the nitrogen-rich precursor is melamine powder. The nitrogen-rich precursor may be present in excess relative to the amount of oxidized pseudo-graphite material particles. In some embodiments, the excess is at least about 2×, at least about 3×, at least about 5×, or at least about 10× by weight of the oxidized pseudo-graphite material particles. The mixture is annealed together, by way of example, for approximately 1 hour at 800 degrees C. in an inert atmosphere such as $N_2$.

The nitrogen-doped material may also be formed by following a pseudo-graphite synthesis procedure (such as those described in U.S. Pat. No. 9,691,556, U.S. Patent Application Publication No. 2012/0228555, and Humayun Kabir et al., "The sp2-sp3 carbon hybridization content of nanocrystalline graphite from pyrolyzed vegetable oil, comparison of electrochemistry and physical properties with other carbon forms and allotropes," published in Carbon, volume 144, pages 831-840, each incorporated by reference herein), but with a suitable nitrogen-bearing precursor substituted for the precursor used to form non-doped pseudo-graphite material. For example, the nitrogen-doped material may be formed by flowing cyanoguanidine vapor and inert gas (e.g., N$_2$) together through a chemical vapor deposition reactor. In some embodiments, the material is formed using a combination of nitrogen-bearing and non-nitrogen-bearing precursors which can be used to vary the degree of nitrogen doping present in the pseudo-graphite produced. In some embodiments, the material is formed at a temperature of approximately 600 degrees C. to approximately 900 degrees C. to form a coating of nitrogen-doped material onto substrates, such as quartz, diatoms, carbon black, etc. Alternatively, the nitrogen doped pseudo-graphite may be formed over a layer of pseudo-graphite by first following a pseudo-graphite synthesis procedure followed directly by a second step of performing chemical vapor deposition using a nitrogen-bearing precursor substituted for or in addition to non-nitrogen-bearing precursors. In some embodiments, the nitrogen doped pseudo-graphite may be formed over a layer of pseudo-graphite where the pseudo-graphite has first been subjected to an oxidative treatment, such as treatment with carbon dioxide at elevated temperature.

In some embodiments, the pseudo-graphite electrode may be chemically modified by additional chemical processing. In some embodiments, the additional chemical processing oxidizes the pseudo-graphite electrode. Illustratively, the chemical modifications include the introduction of epoxides, hydroxyls, amines, thiols, or a combination thereof. In some embodiments, chemical modification may take the form of oxidation of the nitrogen-doped pseudo-graphite to introduce oxygen bearing groups. In some embodiments, the chemical modification includes metallic nanoparticles or other nanomaterials. Illustrative metallic nanoparticles include those formed of gold, silver, iron, platinum, or a combination thereof.

It may be desired for the surface area of the nitrogen-doped electrode to be relatively large. This can be achieved by depositing the nitrogen-doped pseudo-graphite material onto surfaces that have large surface areas, such as glass microsphere assemblies, or by forming particulate nitrogen-doped materials which are then assembled together to form composite nitrogen-doped electrodes.

In the fabrication of nitrogen-doped composite electrodes for electrochemical oxidizer reduction various binders may be used. The binders may include chemically inert or quasi-inert binders including binders such as silicon oxide, aluminum oxide, alumoxanes, nafion, teflon, silicones, etc. The binders may also include binders which are catalytic for oxidizer reduction such as Co$_3$O$_4$, Fe$_3$O$_4$, MnO, Pt, Pd, etc. The binders may be formed as solutions, dispersions or micro-/nano-particulate sols which are mixed with a suspension of nitrogen-doped particulates, which are then co-deposited. For example, nitrogen-doped-pseudo-graphite-on-carbon black particles may be suspended in a dilute Nafion solution/suspension which may then be drop-cast onto a supporting substrate and dried to form a nitrogen-doped-pseudo-graphite-Nafion composite electrode.

Alternatively, a method for forming nitrogen-doped pseudo-graphite material includes the mixture of a suspension of nitrogen-doped pseudo-graphite material with a solution of precursor materials which are then reactively formed into the compositing binder in-situ within deposited nitrogen-doped pseudo-graphite materials. For example, nitrogen-doped pseudo-graphite particles may be mixed and suspended with a solution of preceramic polymer and then drop cast and dried and then fired to form pseudo-graphite material/ceramic composites (e.g. SiC, SiN, SiON, etc.). In another example, nitrogen-doped pseudo-graphite particles may be mixed and suspended with a solution of Starfire SL-454WC in toluene and drop-cast and heated in an inert atmosphere at a temperature of approximately 900 degrees C. to form a pseudo-graphite:SiC composite electrode.

In some embodiments, the composite electrode further comprises species which are catalytic to the electrochemical reaction. Such catalysts may include polyoxometallates (such as Keggin POMs), porphyrins, phthalocyanines, and enzymes. In some embodiments, these catalysts may be incorporated into the nitrogen-doped pseudo-graphite-binder suspension as a co-suspension or solution of these materials which may then be drop-cast and dried to form the composite electrode.

The inclusion of additional species that modify the electrochemical processes of the electrode can provide functionality for applications in indirect electrochemical processes. One example is the use of electrodes in conjunction with enzymatic species to enable electrochemical sensing of glucose as it is oxidized to gluconate.

For many electrochemical oxidizer reduction systems it may be advantageous for a membrane to be present which separates the electrode from other portions of the system. Such membranes may be used to perform a variety of functions including providing selectivity in the species transport of species through the membrane and reaching the electrode or maintaining an electrolyte solution in proximity to the electrode that differs from the bulk environment that the electrode system is in contact with or for controlling the diffusion rate of particular species through the membrane to the electrode (e.g., as in a Clark cell) and to separate one electrode from another which are in close physical proximity. For example, fluorocarbon membranes such as Nafion, Teflon, Teflon AF2400, FEP and similar compounds may be used. Organic membranes, such as gel-electrolyte membranes may be used to separate electrodes in near proximity. Ceramic membranes may also be used, especially for use at higher temperatures in devices such as solid oxide fuel cells using e.g., yttria-stabilized zirconia (YSZ).

The electrode 14 may be used with various electrolyte systems including aqueous and non-aqueous solvents. In some embodiments, non-aqueous electrolytes such as ionic liquids or deep eutectic solvents may be used. In some embodiments, electrolytes may be chosen to be relatively hydrophobic in order to reduce system sensitivity to local changes in the chemical potential of water.

Specific applications in which electrode 14 may be applied include energy storage and generation applications such as fuel cells and metal-air batteries and sensor applications. In fuel cells the anode consumes fuel e.g., H$_2$ in the following:

$$2H_2 \rightarrow 4H^+ + 4e^- \quad E°=0.0 \text{ V}$$

Other fuels are also possible including e.g., methanol and ethanol. The cathode consumes oxygen as:

$$O_2 + 4H^+ + 4e^- \rightarrow 2H_2O \quad E°=1.23 \text{ V}$$

The combination of the reactions above give a theoretical 1.23 V, however fuels cells generate less than this given losses due to resistance and slow electrode kinetics. The Oxygen Reduction Reaction (ORR) cathode requires catalysts that increase the rate of this reaction for improvement of overall fuel performance. Present designs require platinum catalysts dispersed on a high surface area carbon substrate (PtC) for this application. Besides costs, the PtC ORR catalysts degrade with time as the Pt surfaces are poisoned and/or lost as the carbon substrate itself corrodes. There is a search for Pt-free ORR electrodes that overcome these drawbacks. Among those efforts are nitrogen-doped carbon materials which promise low costs as they obviate the need for expensive Pt. However, N-doped carbon materials still undergo a degradation process.

The electrode 14 will also facilitate improving metal-air batteries. The half reactions in these devices follow as:

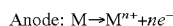

Anode: $M \rightarrow M^{n+} + ne^-$

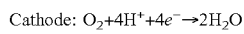

Cathode: $O_2 + 4H^+ + 4e^- \rightarrow 2H_2O$

Where the metal M can be Zn, Fe, Al, or Mg.

Various sensors use electrochemical processes to detect chemical species via the reduction of oxidizing compounds. These include direct detection of oxidizing species such as oxygen and hydrogen peroxide and indirect detection of species such as glucose which are reacted to produce an oxidizing species which is then detected.

Figure 9:
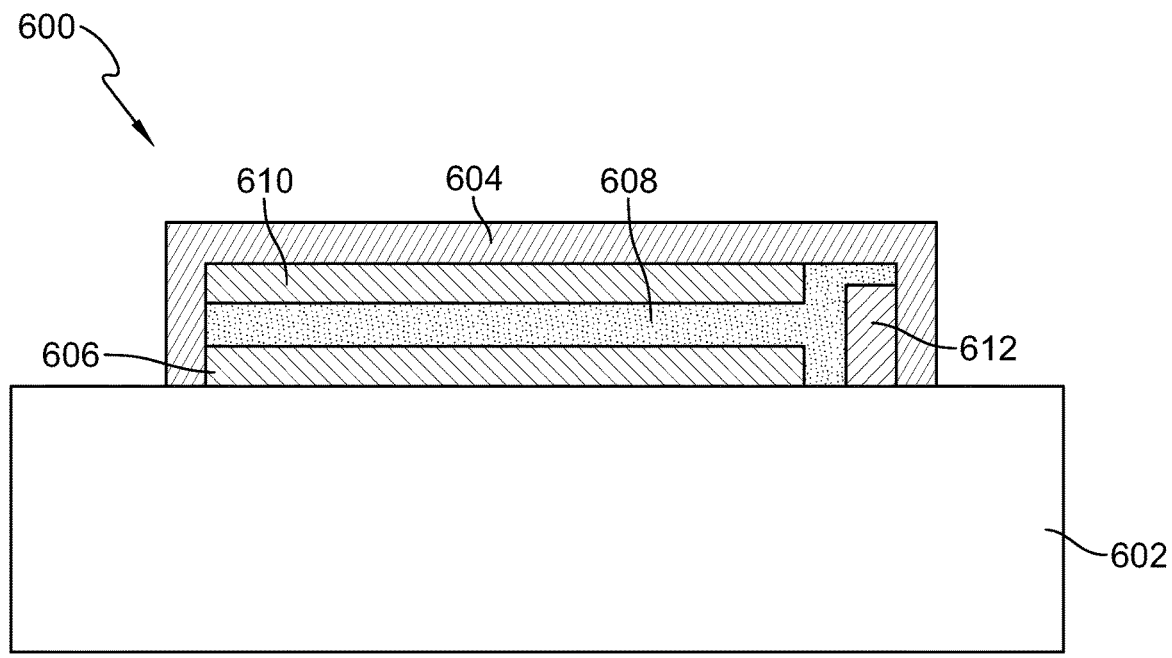
FIG. 9 is schematic cross-sectional view of an electrochemical device in accordance with an embodiment.

Nitrogen-doped pseudo-graphite material and composites thereof may be used as an electrode for electrochemical sensing by electrochemical reduction of oxidizing compounds. This may be used in a variety of configurations with other electrodes. In one embodiment, shown in FIG. 9, a Clark-cell-type device 600 may be produced by depositing (e.g., by screen printing) a set of electrodes onto an inert substrate 602 (e.g. a printed circuit board substrate) and encapsulating the set of electrodes with an encasing membrane 604 (e.g. made of Teflon, FEP, Teflon 2400, etc.). This stack of electrodes may comprise a bottom counter electrode 606 (e.g. made of non-doped pseudo-graphite, graphene, graphite, gold, etc.) with a gel-electrolyte membrane separator 608 on top of the bottom electrode and a nitrogen-doped pseudo-graphite material electrode 610 on top of that, and a reference electrode 612, which is next to both of these electrodes. In some embodiments, the top nitrogen-doped pseudo-graphite material electrode will be constructed in such a way as to have significant porosity to permit species transportation through the top nitrogen-doped pseudo-graphite material electrode layer. This can be achieved, for example, by forming the nitrogen-doped pseudo-graphite material working electrode from high-aspect ratio nano-/micro-particles (e.g. nitrogen-doped pseudo-graphite material grown onto carbon fiber or nanowires).

In one illustrative embodiment, the working electrode 14 is a nitrogen-doped electrode and possesses improved properties for electrochemical oxidant reduction and the utilization thereof for processes and systems to carry out electrochemical oxidant reduction. The electrochemical reduction of oxygen is useful for various applications including fuel cells, metal-air batteries and sensors. The sensing of other oxidizing compounds, such as hydrogen peroxide and chlorine oxide is technologically beneficial as a capability for various applications.

The nitrogen-doped electrode provides advantages in terms of durability, electrode activity and efficiency and is relatively tolerant to a range of electrolyte systems. Furthermore, the nitrogen-doped electrode provides cost advantages versus many alternative options such as carbon supported platinum (Pt/C) which is commonly used for fuel cell applications.

Figure 4:
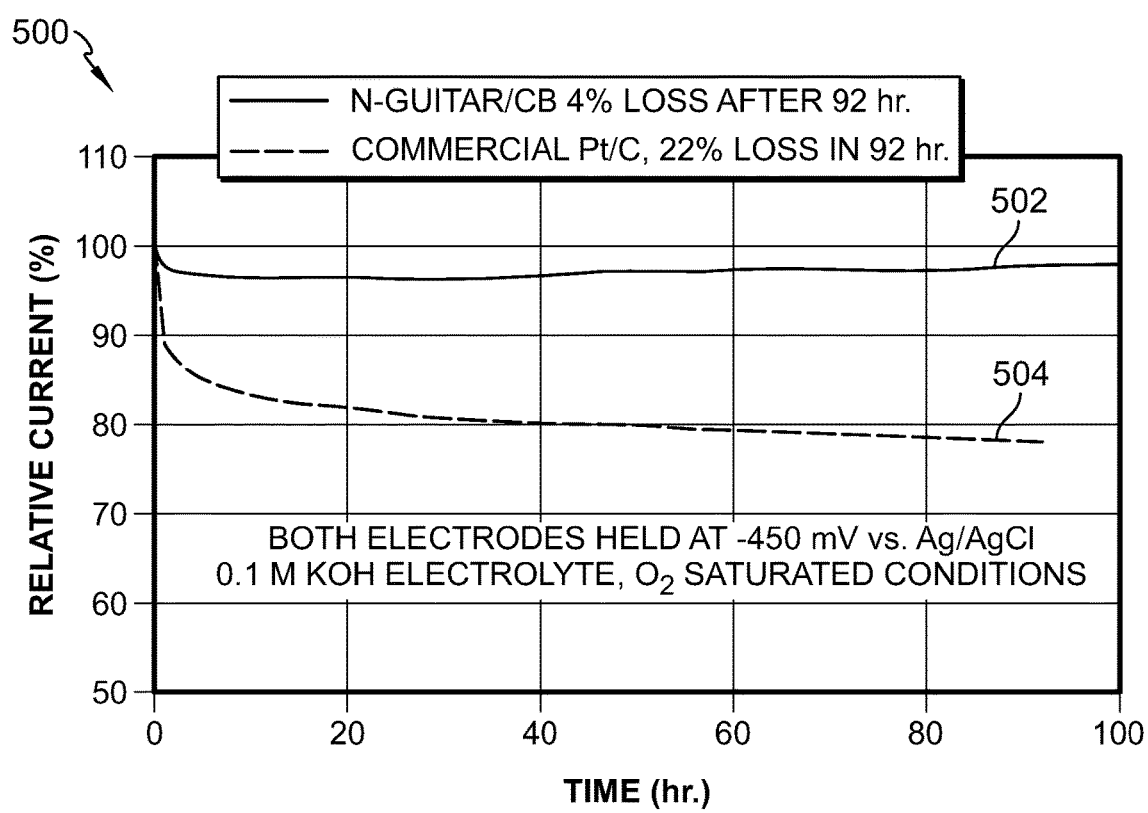
FIG. 4 is a graph of relevant current over time in a n-pseudo-graphite electrode and a Pt/C electrode.

It has been observed that the nitrogen-doped pseudo-graphite electrode facilitates maintaining functional activity for the oxygen reduction reaction. For example, in the graph 500 of FIG. 4, the nitrogen-doped electrode is observed to be stable (losses of approximately 4% activity) over a period of 92 hours held at a potential of −450 mV vs. Ag/AgCl in a rotated disk electrode operated at 800 rpm, in line 502. In contrast, a Pt/C electrode is observed to suffer a loss of 22% over the same period, in line 504.

Figure 5:
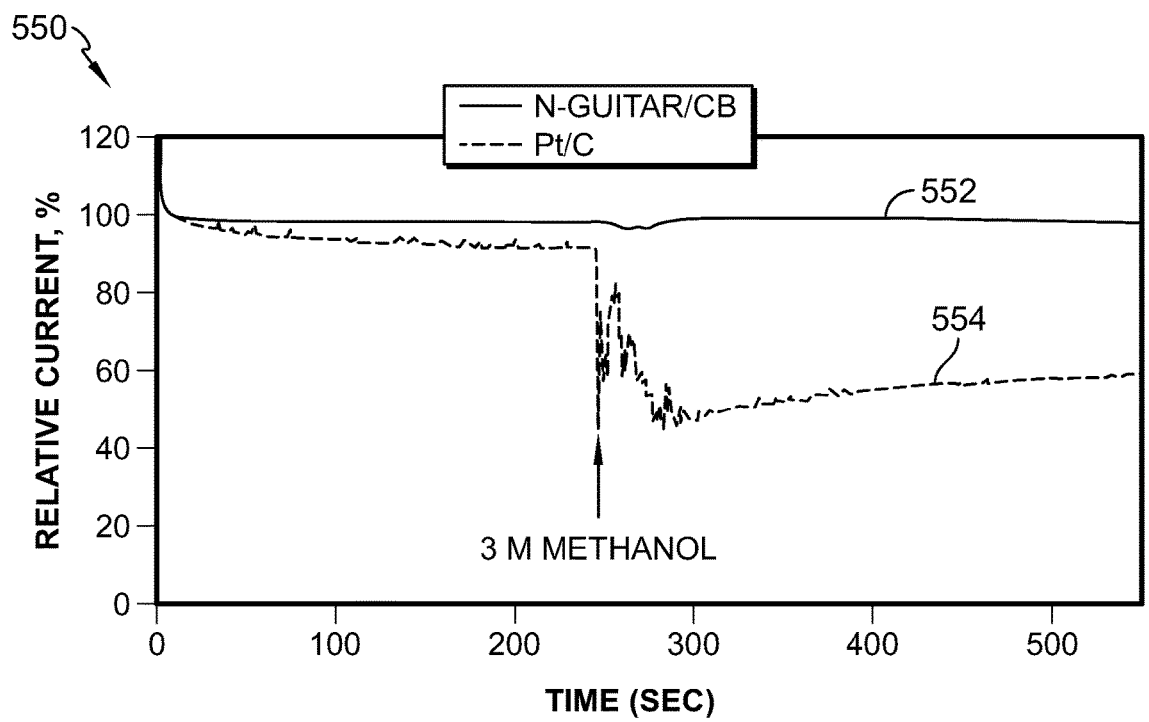
FIG. 5 is another graph of relevant current over time in a n-pseudo-graphite electrode and a Pt/C electrode.
Figure 6:
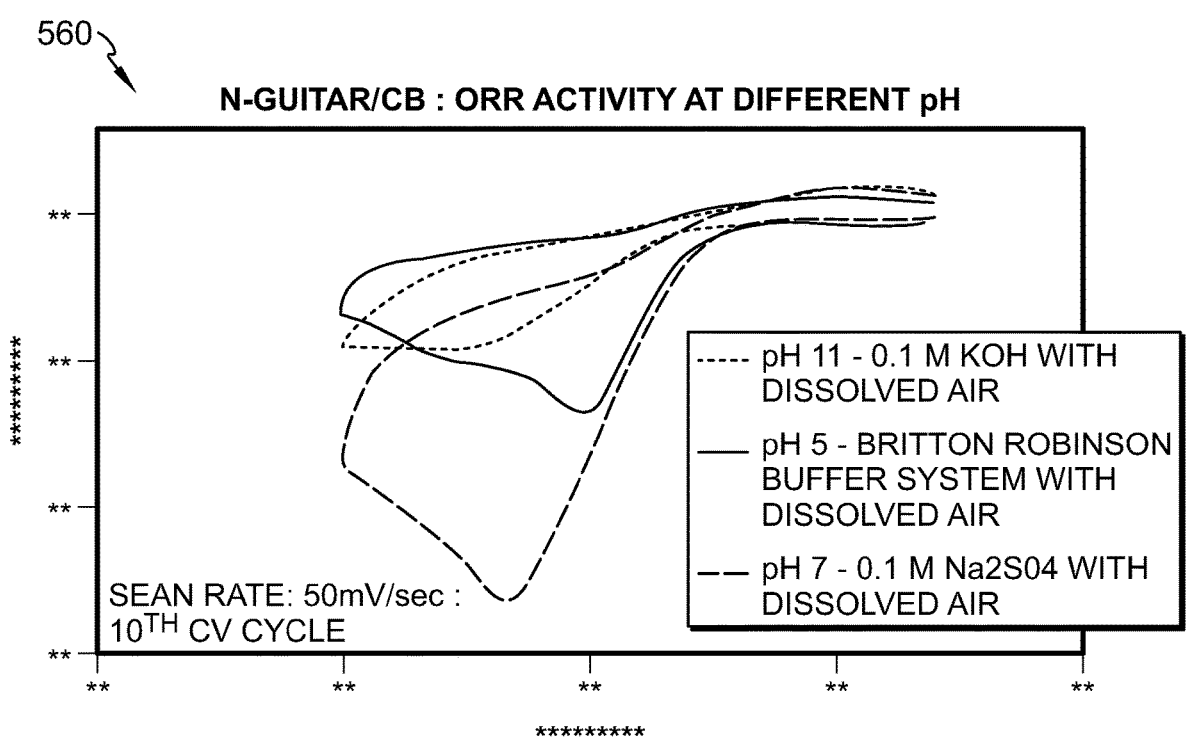
FIG. 6 is a graph of n-pseudo-graphite/CB ORR activity at different pH levels.

It is observed that the nitrogen-doped electrode will maintain its electrode activity for the oxidation reduction reaction in a variety of electrolyte systems. This includes a high tolerance for additional organic species. Referring to the graph 550 in FIG. 5 the nitrogen-doped electrode maintains activity in a solution of 3M methanol, in line 552. Pt/C loses 45% of its activity under those same conditions, in line 454. Referring to the graph 560 in FIG. 6, the nitrogen-doped electrode facilitates providing significant response for the oxygen reduction reaction in acidic, neutral and alkaline pH values. This tolerance to various electrolyte systems is advantageous for various aspects of energy storage/generation (e.g. fuel cell) and sensing applications. For example, in fuel cell applications, the electrode may be poisoned by the leakage of fuel, such as methanol, into the cathode compartment. The tolerance of the electrode to the presence of methanol is advantageous to the operation of such fuel cells. In sensor applications, the tolerance to environmental variations allows operation in a more diverse range of environments with reduced interferences.

Figure 7:
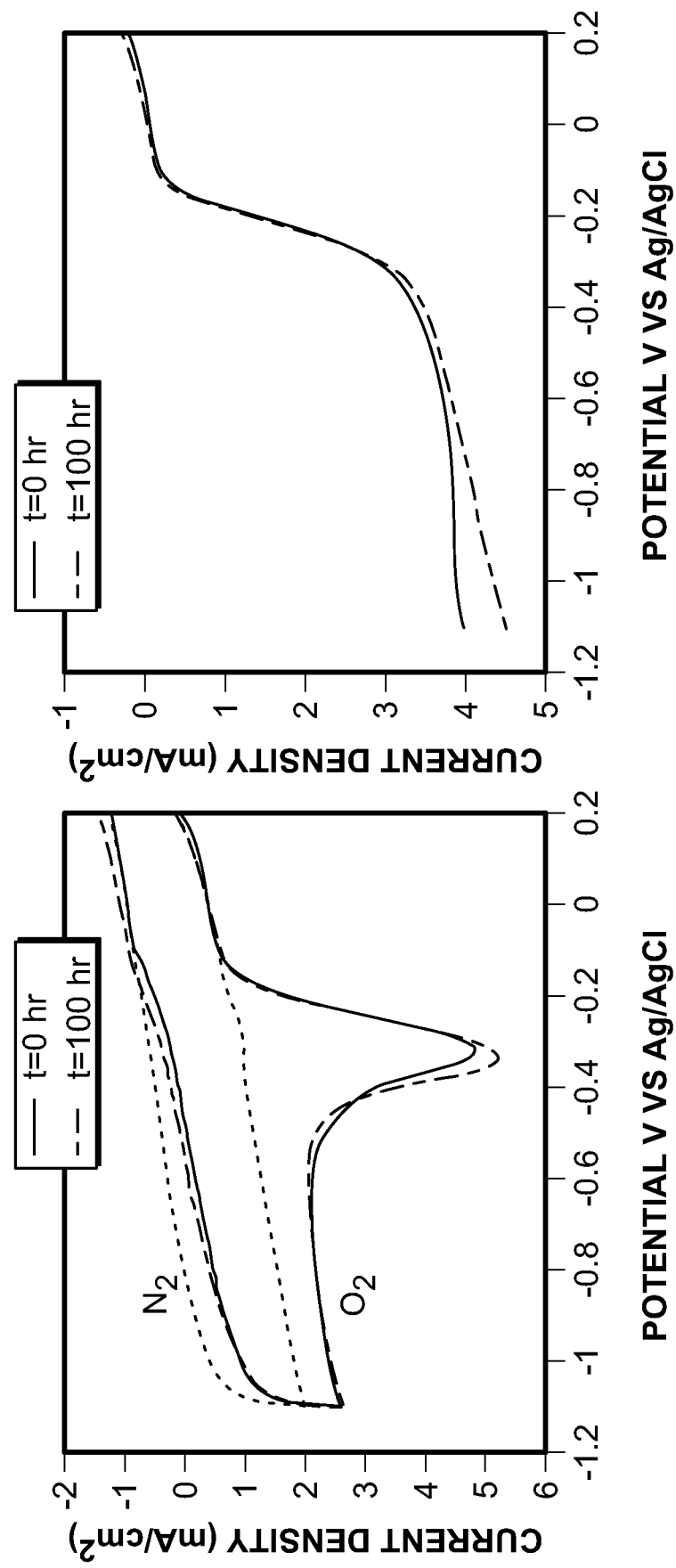
FIG. 7 is a graph of current density over potential V vs. Ag/AgCl.
Figure 8:
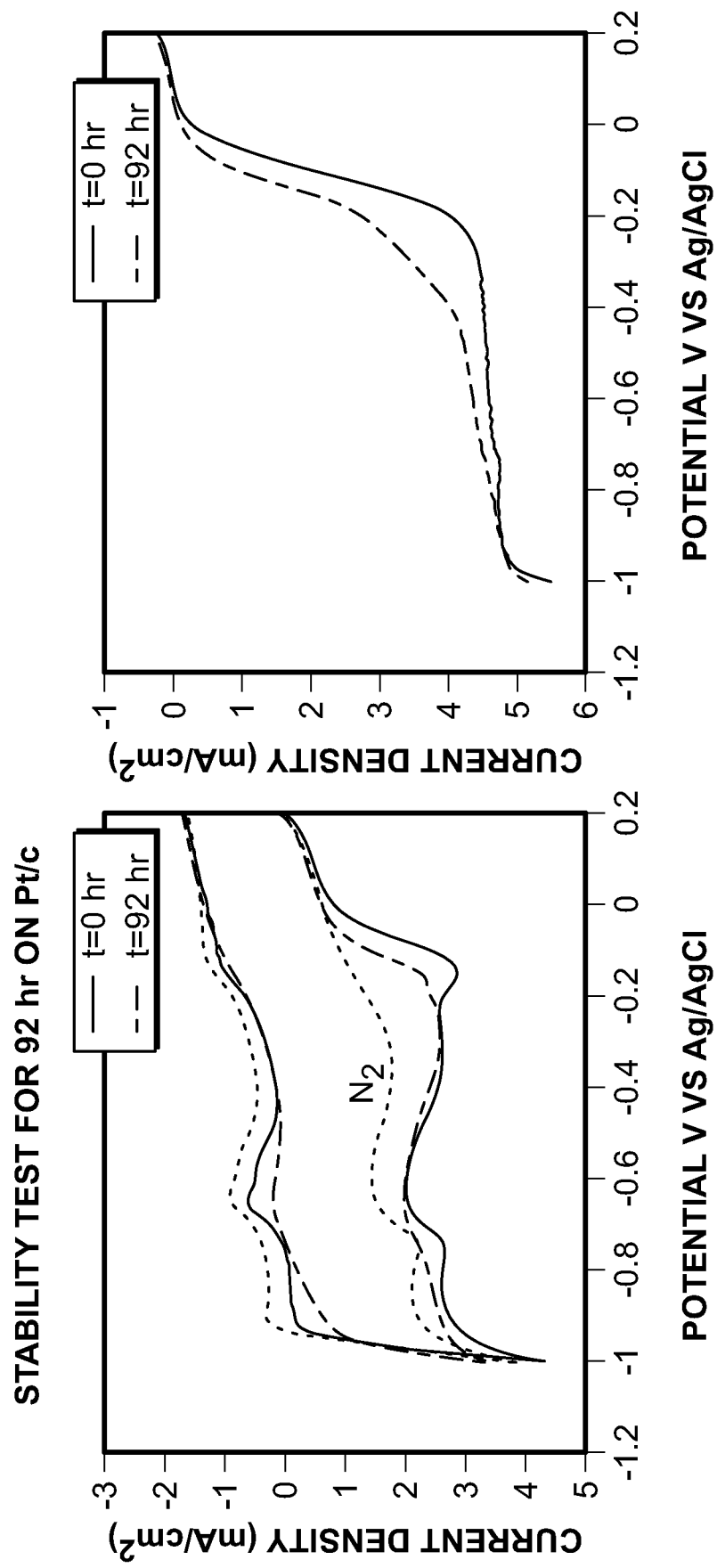
FIG. 8 is another graph of current density over potential V vs. Ag/AgCl.

The performance of nitrogen-doped pseudo-graphite material for the oxygen reduction reaction may be seen in FIG. 7 and FIG. 8, which illustrate the cyclic voltammetric oxygen reduction performance of nitrogen-doped pseudo-graphite material electrodes. Cyclic voltammetric (CV) and hydrodynamic studies of the nitrogen-doped pseudo-graphite material system also confirm its durability. This is in contrast to a Pt/C commercial composite electrode which shows the decay in performance both in the CV and rotating disk electrode after 90 hours of continuous use.

In some embodiments, a form of amine-functionalized pseudo-graphite (hereafter abbreviated as "AFPG") possesses improved properties for electrochemical oxidant reduction and can be used for processes and systems to carry out electrochemical oxidant reduction. In particular, the electrochemical reduction of oxygen is useful for various applications including fuel cells, metal-air batteries and sensors. The sensing of other oxidizing compounds (such as hydrogen peroxide, chlorine oxide) is technologically beneficial as a capability for various applications.

The AFPG material provides advantages particularly in terms of electrode activity and efficiency. Furthermore, the AFPG material provides cost advantages versus many alternative options such as carbon supported platinum (Pt/C) which is commonly used for fuel cell applications. The AFPG electrode provides similar characteristics to nitrogen-doped pseudo-graphite electrodes, and is a similar, but not identical, material.

Figure 10:
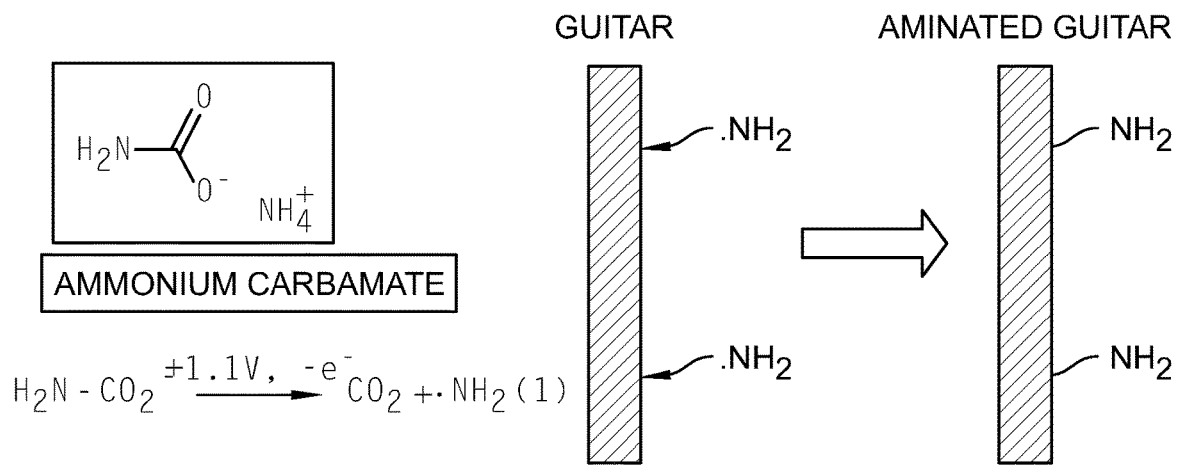
FIG. 10 is a schematic view of a process for forming amine-functionalized pseudo-graphite.

AFPG is formed through a two-step process, shown in FIG. 10, wherein a chemical vapor deposition process in first used to produce pseudo-graphite material and then amine-groups are functionalized onto the surface by a wet-chemical reaction. Amine groups may also be incorporated onto the surface of a pseudo-graphite electrode by ammonia plasma treatment.

Figure 11:
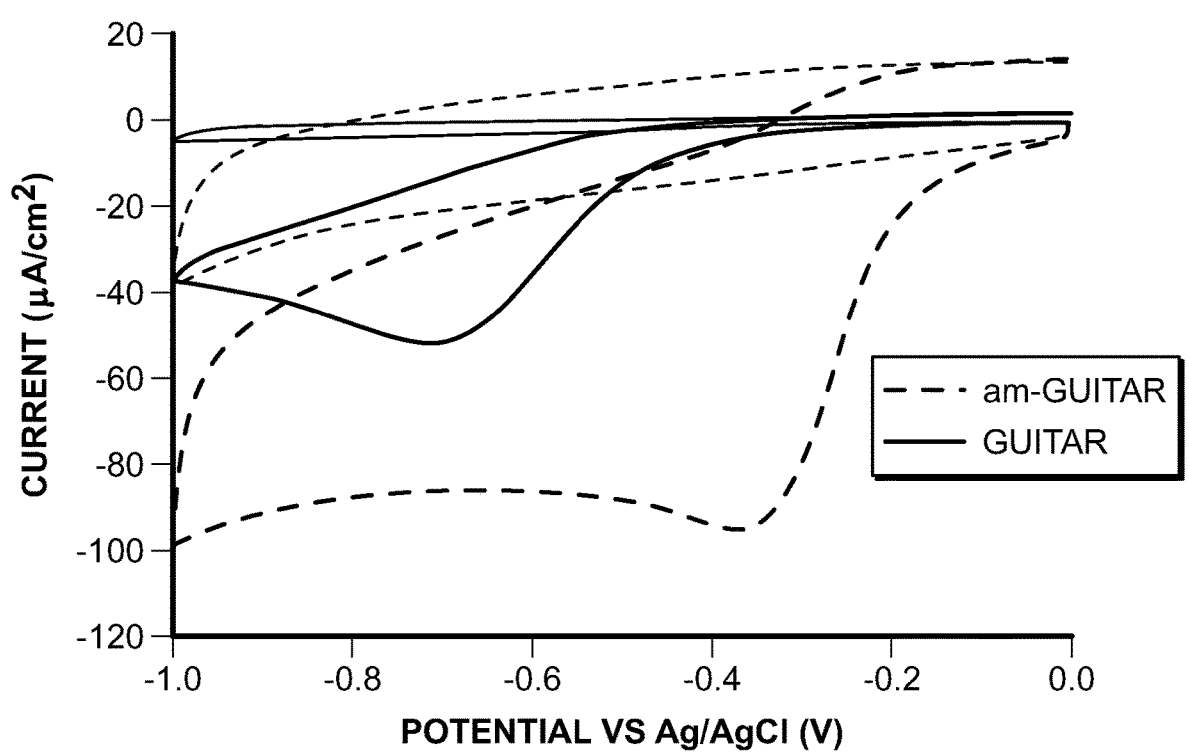
FIG. 11 is a graph showing the difference between amine-functionalized pseudo-graphite electrochemical signal (dashed lines) in oxygenated vs. oxygen-purged environments and non-aminated pseudo-graphite (solid lines) also in oxygenated vs. oxygen purged environments.

Specific embodiments and chemistries will generally be similar to those described for nitrogen-doped pseudo-graphite for use as an oxygen reduction reaction electrode. The performance of an AFPG electrode for the oxygen reduction reaction is illustrated in FIG. 11.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A method comprising:
providing an electrode substrate having a surface that is coated with a pseudo-graphite material surface;
doping a pseudo-graphite material with nitrogen to form a nitrogen-doped pseudo-graphite material; and
applying the nitrogen-doped pseudo-graphite material to the pseudo-graphite material surface of the electrode substrate to form an electrode.

2. The method of claim 1, wherein doping the pseudo-graphite material with nitrogen comprises decomposing a nitrogen-bearing hydrocarbon molecule to form a nitrogen-doped film of pseudo-graphite material.

3. The method of claim 2, wherein applying the nitrogen-doped pseudo-graphite material to the pseudo-graphite material surface of the substrate comprises applying the nitrogen-doped film of pseudo-graphite material to the pseudo-graphite material surface of the substrate.

4. The method of claim 1, wherein the pseudo-graphite material surface of the substrate is chemically modified prior to applying the nitrogen-doped pseudo-graphite material to the chemically modified pseudo-graphite material surface of the substrate.

5. The method of claim 4, wherein the pseudo-graphite material surface is modified prior to applying the nitrogen-doped pseudo-graphite material by oxidizing the pseudo-graphite material surface with a solution of sulfuric acid, sodium nitrate, and water.

6. The method of claim 4, wherein the pseudo-graphite material surface is modified prior to applying the nitrogen-doped pseudo-graphite material by applying streams of oxygen diluted by inert gas.

7. The method of claim 4, wherein the pseudo-graphite material surface is modified prior to applying the nitrogen-doped pseudo-graphite material by applying an atmosphere containing at least one of ozone, carbon dioxide, or vapor.

8. The method of claim 1, wherein doping a pseudo-graphite material with nitrogen comprises flowing cyanoguanidine and an inert gas over the pseudo-graphite material.

9. An electrode comprising:
an electrode substrate having a surface that is coated with a pseudo-graphite material surface, and
a nitrogen-functionalized pseudo-graphite material applied to the pseudo-graphite material surface of the substrate.

10. The electrode of claim 9, wherein the nitrogen-functionalized pseudo-graphite material comprises a nitrogen-doped film of pseudo-graphite material formed from decomposition of a nitrogen-bearing hydrocarbon molecule.

11. The electrode of claim 9, wherein the pseudo-graphite material surface of the substrate has been chemically modified.

12. The electrode of claim 11, wherein the pseudo-graphite material surface has been modified by oxidizing the pseudo-graphite material surface.

13. The electrode of claim 9, wherein the nitrogen-functionalized pseudo-graphite material comprises amine groups functionalized onto a surface of pseudo-graphite material.

14. An electrochemical device comprising:
an electrode comprising:
an electrode substrate having a surface that is coated with a pseudo-graphite material surface; and
a nitrogen-functionalized pseudo-graphite material applied to the pseudo-graphite material surface of the electrode substrate, and
an electrical source to supply at least one of a current or voltage to the electrode.

15. The electrochemical device of claim 14, further comprising a measurement circuit to measure a resultant signal from the electrode.

16. The electrochemical device of claim 14, wherein the device facilitates an electrochemical reduction of an oxidizing species.

17. The electrochemical device of claim 16, wherein the device facilitates an oxygen reduction reaction of the oxidizing species.

18. The electrochemical device of claim 17, wherein the device facilitates sensing a presence and amount of oxygen.

19. The electrochemical device of claim 14, wherein the device is a fuel cell.

20. The electrochemical device of claim 14, wherein the nitrogen-functionalized pseudo-graphite material comprises a nitrogen-doped film of pseudo-graphite material.

21. The electrochemical device of claim 20, wherein the nitrogen-functionalized pseudo-graphite material comprises amine groups functionalized onto a surface of pseudo-graphite material.

* * * * *